US006051204A

United States Patent [19]

Bowe et al.

[11] Patent Number: 6,051,204

[45] Date of Patent: Apr. 18, 2000

[54] REAGENT MIXING

[75] Inventors: Michael Joseph Bowe; Paul Fallows, both of Preston, United Kingdom

[73] Assignee: AEA Technology PLC, Didcot, United Kingdom

[21] Appl. No.: 08/935,499

[22] Filed: Sep. 22, 1997

Related U.S. Application Data

[63] Continuation of application No. 08/447,956, May 23, 1995, abandoned, which is a continuation of application No. 08/173,500, Dec. 27, 1993, abandoned, which is a continuation of application No. 07/822,899, Jan. 21, 1992, abandoned.

[30] Foreign Application Priority Data

Jan. 30, 1991 [GB] United Kingdom .................... 9101967

[51] Int. Cl.$^{7}$ ................................ B01J 8/00; B01F 3/12; B01F 5/10

[52] U.S. Cl. .......................... 423/659; 422/224; 422/225; 422/227; 239/10; 239/13; 239/310; 261/77; 261/127; 366/134; 366/136; 366/137

[58] Field of Search .................................... 422/225, 227, 422/150, 224; 366/176, 341, 176.1–176.4, 134–137; 239/310, 10, 13; 261/77, 127; 423/243.05, 659, 11

[56] References Cited

U.S. PATENT DOCUMENTS

| | | | |
|---|---|---|---|
| 3,723,545 | 3/1973 | Nagel et al. | 261/77 |
| 3,910,826 | 10/1975 | Kataoka | 261/77 |
| 3,938,738 | 2/1976 | Nagel et al. | 261/77 |
| 4,000,978 | 1/1977 | Henrie | 422/224 |
| 4,448,539 | 5/1984 | Burgert | 366/132 |
| 5,084,252 | 1/1992 | Cahill et al. | 423/16 |

*Primary Examiner*—Hien Tran

*Attorney, Agent, or Firm*—D. Peter Hochberg; William H. Holt

[57] ABSTRACT

A method of, and apparatus for, preventing the formation of deposits on surfaces downstream of a mixer in which possibly supersaturated mixtures issuing from the mixer are surrounded by a sheath of unsaturated solution. In an arrangement described, the sheath of unsaturated mixture is obtained by bleeding off some of the mixture issuing from the mixer sufficiently downstream of the mixer definitely to be unsaturated and returning this portion of the mixture to surround that issuing from the mixer.

4 Claims, 1 Drawing Sheet

REAGENT MIXING

This is a continuation of application Ser. No. 08/447,956 filed May 23, 1995, now abandoned, which is a continuation of Ser. No. 08/173,500 filed Dec. 27, 1993, now abandoned, which is a continuation of Ser. No. 07/822,899 filed Jan. 21, 1992, now abandoned.

The present invention relates to the mixing and transport of reactive substances.

In processes which involve the mixing and transport of reactive substances, the formation of unwanted precipitates on internal walls of reactor vessels and pipework can cause problems.

Such unwanted precipitates can arise from the formation of localised regions of supersaturation in the mixture and it is an object of the present invention to provide a method of and apparatus for mixing reactive substances in which the output from a mixing device such as a vortex mixer is isolated from contact with any solid surfaces in the vicinity of the vortex mixer.

According to one aspect of the present invention there is provided a method of mixing reactive substances, comprising the operations of admitting the substances to a mixer and surrounding the output flow from the mixer with an unsaturated mixture of the reactive substances.

Preferably, the output flow from the mixer is directed axially along an axial diffuser and the pressure difference which occurs in use between the ends of the diffuser is used to return a portion of the flow from the axial diffuser to the outlet from the mixer to envelop the output flow from the mixer.

A suitable mixing device is a vortex mixer.

Also according to the present invention there is provided an apparatus for mixing reactive substances, comprising a mixer, means for supplying to the mixer substances to be mixed, means for directing an output flow from the mixer along a predetermined path and means for enveloping the output flow from the mixer with an unsaturated mixture of the reactive substances.

Preferably the apparatus includes an axial diffuser so arranged that the output from the mixer flows axially along it and part of the mixture issuing from the axial diffuser is bled off and returned to the inlet to the axial diffuser so as to envelop the output flow from the mixer so as to isolate it from the structure of the axial diffuser.

Preferably, the mixer is a vortex mixer comprising a vortex chamber having one or more inlets arranged to direct an inlet flow substantially tangentially into the vortex chamber and an axial outlet in an end wall of the chamber. The end wall of the chamber can be planar or conical in form.

DESCRIPTION OF THE DRAWINGS

The invention will be described further, by way of example, with reference to the accompanying drawings in which:

In FIG. 1, a vortex mixer 1 is secured by bolts 2 to the flanged end of a housing 3. The vortex mixer 1 comprises a vortex chamber 4 having one or more inlet ports 5, preferably at the periphery of the chamber 4, to direct an inlet flow tangentially or substantially tangentially into the chamber 4 and a central axial outlet 6 in an end wall of the chamber 4. In FIG. 1, the chamber 4 is provided with a pair of diametrically opposed tangentially directed inlet ports 5. Liquids introduced through the ports 5 swirl through the chamber and in so doing become thoroughly mixed before exiting at the outlet 6.

Figure 1:
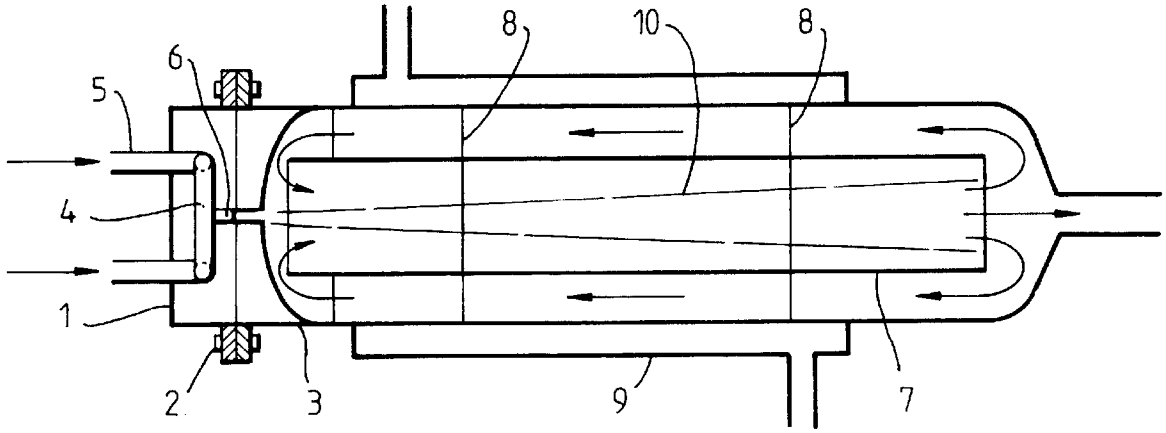
FIG. 1 is a schematic longitudinal sectional view of an embodiment.

The housing 3 contains a centrally located tube 7 coaxial with the housing 3 and held in position, for example, by a spider assembly 8. A cooling jacket 9 can be provided about the housing 3. The tube 7 functions as an axial diffuser.

In operation, reagents introduced at the separate inlets 5 are mixed in the vortex chamber 4 whereby the product of the reaction becomes supersaturated in solution. This takes place very quickly after mixing and a further short time interval, known as the precipitate induction time and which can be of the order of milliseconds in duration, elapses before the commencement of precipitate formation. Thereafter precipitate forms rapidly and supersaturation levels decrease until at equilibrium solubility, where supersaturation is negligible, precipitate formation comes to an end.

Precipitation takes place if the supersaturated mixture from the vortex chamber 4 contacts a solid surface. This can cause blockage and fouling in the flow line from the vortex mixer. The presence of the coaxial tube 7 within the housing 3 serves to avoid such blockage and fouling.

The supersaturated mixture emerging at the outlet 6 from the vortex chamber 4 is in the form of a jet which expands radially with distance from the outlet. In FIG. 1 the envelope or confines of the stream issuing from the outlet 6 and passing along the tube 7 is indicated by the reference numeral 10. The jet emerging from the outlet 6 along the centre line of the tube 7 entrains liquid mixture, which is no longer supersaturated and is known as aged, from the downstream end of the tube 7. The flow directions are indicated by the arrows in FIG. 1. A portion of the aged flow at the downstream end of the tube 7 is drawn between the exterior of the tube 7 and the interior of the housing 3 to surround the jet emerging from the outlet 6. This aged flow serves as a jacket or shield about the supersaturated mixture from the outlet 6 to prevent the mixture encountering a solid surface during its travel through the tube 7 and housing 3.

Figure 2:
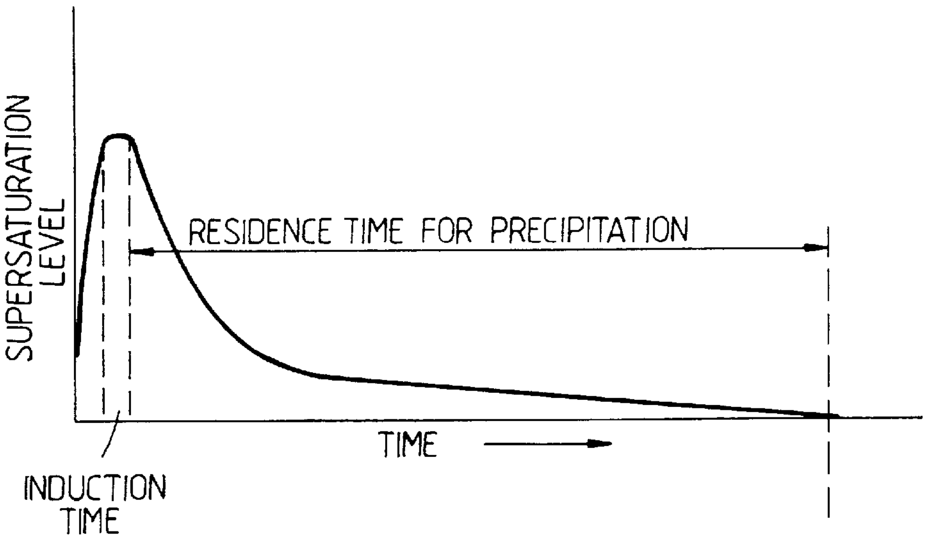
FIG. 2 is a graph of supersaturation levels plotted along the length of the embodiment in FIG. 1.

FIG. 2 illustrates how supersaturation levels decrease with time in the axial direction of flow. In a correctly dimensioned assembly the residence time within the tube 7 is sufficient for the supersaturated mixture to become fully aged so that no fouling or blockage takes place in pipework downstream of the assembly comprising the vortex mixer 1, tube 7 and housing 3. The tube 7 allows the precipitate residence time in which the solution solubility can reach equilibrium without the supersaturated flow from the vortex mixer 1 coming into contact with solid surfaces. In this way the flow from the vortex mixer 1 can age without solid deposits fouling surfaces of the tube 7 and the walls of downstream pipework.

We claim:

1. A method of preventing precipitation of a solid during mixing of reactive substances susceptible to precipitation of a solid upon contact between a supersaturated mixture thereof and solid surfaces, comprising the steps of admitting said reactive substances to a mixer and surrounding an output flow from the mixer with a sheath of a flowing unsaturated mixture of said reactive substances to isolate said output flow from structural surfaces used in the method.

2. A method according to claim 1 comprising directing the output flow from the mixer directly into and axially along an axial diffuser and recirculating and using only a portion of the unsaturated mixture leaving the axial diffuser to envelop the axially directed mixture entering the axial diffuser from the mixer so as to isolate the axially directed mixture entering the axial diffuser from the structure of the axial diffuser.

3. A method of mixing reactive substances which are susceptible to the precipitation of a solid material upon a solid surface in contact with a supersaturated mixture of the reactive substances, comprising the steps of continuously introducing the reactive substances into a mixer, continuously directing a stream of a mixture of the reactive substances from an outlet of the mixer directly into and along a flow path surrounded by solid surfaces, recirculating part only of the mixture from a point along said flow path where the mixture is unsaturated back to the area where the outlet stream is directed into said flow path, and introducing said recirculated part into said flow path about said stream in such a manner as to provide a sheath of unsaturated mixture surrounding the mixture entering said flow path directly from said mixture outlet thereby to isolate the outlet stream of mixture entering said flow path from said solid surfaces surrounding the flow path.

4. An apparatus for mixing reactive substances which are susceptible to the precipitation of a solid material upon a solid surface in contact with a supersaturated mixing of the reactive substances, comprising a vortex mixer having at least one tangential inlet for a reactant, an inlet for a second reactant and an axial outlet, means for supplying to said inlets reactive substances to be mixed and discharged through said outlet, a housing surrounding a tubular component, said tubular component functioning as an axial diffuser having a diffuser inlet in communication with the outlet from the vortex mixer and an outlet for directing the mixture in a conical stream through the tubular component towards a discharge outlet of the housing, and a cooling jacket surrounding the housing; said housing, said tubular component and said discharge outlet being positioned to cause a portion of the mixture as it leaves the axial diffuser to be recirculated between the housing and the tubular component back to the diffuser inlet in such a manner as to provide a sheath of unsaturated mixture of the reactive substances surrounding the mixture entering the axial diffuser from the mixer outlet thereby to isolate the mixture entering the axial diffuser from the mixer outlet from the tubular component of the axial diffuser.

* * * * *